(12) United States Patent
Ma et al.

(10) Patent No.: US 9,907,083 B2
(45) Date of Patent: Feb. 27, 2018

(54) MULTI-CARRIER AGGREGATION METHOD AND APPARATUS, USER EQUIPMENT, AND NETWORK SIDE DEVICE

(71) Applicant: Huawei Technologies Co., Ltd., Shenzhen (CN)

(72) Inventors: Chixiang Ma, Shanghai (CN); Jiayin Zhang, Shanghai (CN); Yingpei Lin, Shanghai (CN); Tianyu Wu, Shenzhen (CN)

(73) Assignee: Huawei Technologeis Co., Ltd., Shenzhen (CN)

( * ) Notice: Subject to any disclaimer, the term of this patent is extended or adjusted under 35 U.S.C. 154(b) by 84 days.

(21) Appl. No.: 15/190,893

(22) Filed: Jun. 23, 2016

(65) Prior Publication Data

US 2016/0309492 A1 Oct. 20, 2016

Related U.S. Application Data

(63) Continuation of application No. PCT/CN2013/090244, filed on Dec. 23, 2013.

(51) Int. Cl.
*H04W 72/12* (2009.01)
*H04W 72/04* (2009.01)
(Continued)

(52) U.S. Cl.
CPC ....... *H04W 72/12* (2013.01); *H04W 72/0446* (2013.01); *H04W 74/0808* (2013.01); *H04W 84/12* (2013.01)

(58) Field of Classification Search
CPC ............. H04W 72/12; H04W 72/0446; H04W 74/0808; H04W 84/12
See application file for complete search history.

(56) References Cited

U.S. PATENT DOCUMENTS

| 5,838,667 A | 11/1998 | Bingham et al. |
| 2012/0026997 A1* | 2/2012 | Seok ........ H04L 5/001 370/338 |

(Continued)

FOREIGN PATENT DOCUMENTS

| CN | 1190511 A | 8/1998 |
| CN | 1555148 A | 12/2004 |

(Continued)

OTHER PUBLICATIONS

Ratasuk et al. "License-Exempt LTE Deployment in Heterogeneous Network," IEEE Wireless Communication Systems, pp. 246-251, Institute of Electrical and Electronics Engineers, New York, New York (Aug. 28-31, 2012).

(Continued)

*Primary Examiner* — Lakeram Jangbahadur
(74) *Attorney, Agent, or Firm* — Leydig, Voit & Meyer, Ltd.

(57) ABSTRACT

A multi-carrier aggregation method and apparatus, user equipment, and a network side device are disclosed. The method includes: determining, by a network side device according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and performing, by the network side (Continued)

device, downlink transmission with user equipment in the downlink phase of the scheduling phase.

22 Claims, 7 Drawing Sheets

(51) Int. Cl.
*H04W 74/08* (2009.01)
*H04W 84/12* (2009.01)

(56) References Cited

U.S. PATENT DOCUMENTS

| | | |
|---|---|---|
| 2012/0113918 A1 | 5/2012 | Freda et al. |
| 2013/0170406 A1 | 7/2013 | Kishiyama |
| 2014/0071931 A1* | 3/2014 | Lee .................. H04L 5/001 370/329 |

FOREIGN PATENT DOCUMENTS

| | | |
|---|---|---|
| CN | 102469464 A | 5/2012 |
| CN | 102685755 A | 9/2012 |
| CN | 103190192 A | 7/2013 |
| WO | WO 2012157994 A2 | 11/2012 |
| WO | WO 2013006988 A1 | 1/2013 |

OTHER PUBLICATIONS

"IEEE Standard for Information technology-telecommunications and information exchange between systems Local and metropolitan area networks-Specific requirements Part 11: Wireless LAN Medium Access Control (MAC) and Physical Layer (PHY) Specifications," IEEE Std 802.11, pp. i-2695, Institute of Electrical and Electronics Engineers, New York, New York (Mar. 29, 2012).

Perahia et al. "Next Generation Wireless LANs Throughput, Robustness, and Reliability in 802.11n," pp. i-385, Cambridge University Press, New York, New York (Sep. 2008).

"IEEE draft STANDARD for information Technology Telecommunications and information exchange between systems Local and metropolitan area networks Specific requirements Part 11: Wireless LAN Medium Access Control (MAC) and Physical Layer (PHY) specifications Amendment 4: Enhancements for Very High Throughput for Operation in Bands below 6GHz," IEEE P802.11ac/D3.0, pp. i-360, Institute of Electrical and Electronics Engineers, New York, New York (Jun. 2012).

Sesia et al., "LTE—The UMTS Long Term Evolution From Theory to Practice," Second edition, pp. i-752, John Wiley & Sons, Ltd., West Sussex, United Kingdom (2011).

\* cited by examiner

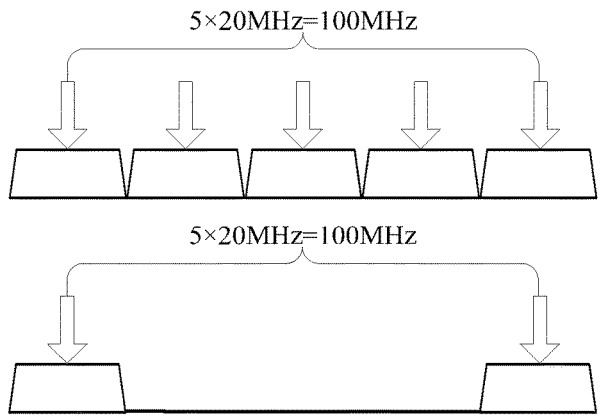

FIG. 1

| QCI | Resource type | Priority | Packet delay budget (ms) | Packet error loss rate | Example services |
|---|---|---|---|---|---|
| 1 | GBR | 2 | 100 | $10^{-2}$ | Conversational voice |
| 2 | GBR | 4 | 150 | $10^{-3}$ | Conversational video (live steaming) |
| 3 | GBR | 5 | 300 | $10^{-6}$ | Non-conversational video (buffered streaming) |
| 4 | GBR | 3 | 50 | $10^{-3}$ | Real time gaming |
| 5 | Non-GBR | 1 | 100 | $10^{-6}$ | IMS signalling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP-based (e.g. WWW, e-mail) chat, FTP, p2p file sharing, progressive video, etc. |
| 9 | Non-GBR | 9 | 300 | $10^{-6}$ | |

MULTI-CARRIER AGGREGATION METHOD AND APPARATUS, USER EQUIPMENT, AND NETWORK SIDE DEVICE

CROSS-REFERENCE TO RELATED APPLICATIONS

This application is a continuation of International Application No. PCT/CN2013/090244, filed on Dec. 23, 2013, which is hereby incorporated by reference in its entity.

TECHNICAL FIELD

The present disclosure relates to the field of communications and, in particular, to a multi-carrier aggregation method and apparatus, user equipment, and a network side device.

BACKGROUND

As application scenarios increase, ever increasing data transmission requirements make load of wireless networks become increasingly heavy. Wireless networks are improved and upgraded in many technological aspects. Among these technologies, a simplest and most direct manner is to increase spectrum resources. Frequency spectrums are strictly controlled by a frequency spectrum management organization, and frequency spectrums obtained in a manner of buying a license can hardly exist continuously; therefore, a technology of using spectrum resource fragments is required to increase a data transmission peak rate. A wireless device can use a free spectrum provided that the wireless device satisfies a power limit. However, data transmission in wireless communications usually requires a specific signal-to-noise ratio, and a free frequency spectrum may be used by some devices at any time; therefore, a technology of using spectrum resource fragments is also required for communication using a free frequency spectrum to increase a data transmission peak rate.

Currently, in daily life, a contradiction between rapidly growing data transmission and bandwidth of wireless communications increasingly deepens. Meanwhile, the trend that wireless spectrum resources are fragmented and dispersed further increases difficulty in transmission of a large amount of data. To fully utilize spectrum resources and satisfy increasing data transmission requirements, a carrier aggregation technology emerges, where this technology can properly resolve the foregoing problem by using spectrum resource fragments.

Conceptually, the carrier aggregation technology is to aggregate two or more component carriers to satisfy a requirement of a higher bandwidth and a higher data transmission rate. Carrier aggregation may be classified into continuous carrier aggregation and non-continuous carrier aggregation according to an extent to which spectrum resources are fragmented, as shown in FIG. 1.

In another aspect, network resources bearing data transmission are limited. Because the 802.11 standard is based on a carrier sense multiple access with collision avoidance (CSMA/CA, Carrier Sense Multiple Access/Collision Avoidance) mechanism, a quality of service (QoS) problem may occur as long as a case in which a network resource is contended for exists. First, because a data transmission volume increases and data services are classified in a more detailed manner, higher requirements are imposed on transmission resource allocation, a transmission latency, a data packet loss rate, and a delay variation, as shown in FIG. 2. Second, total transmission resources are limited; if a service of a specific type occupies more transmission resources for transmitting data, less transmission resources are available for another service to transmit data. Therefore, a higher requirement is also imposed on planning and allocation of transmission resources for various services on an 802.11 network.

In an existing mechanism of the 802.11 standard, channel bandwidth is divided into a primary component carrier and a secondary component carrier to increase signal transmission bandwidth, thereby improving a data transmission peak rate. As shown in FIG. 3, a 40 MHz primary component carrier includes a 20 MHz primary component carrier and a 20 MHz secondary component carrier, an 80 MHz primary component carrier includes a 40 MHz primary component carrier and a 40 MHz secondary component carrier, and a 160 MHz primary component carrier (not shown in the figure) includes an 80 MHz primary component carrier and an 80 MHz secondary component carrier, and so on. The mechanism in the 802.11 standard is similar to carrier aggregation; however, in this mechanism, contention-based access to a carrier is needed. Contention-based access to a carrier is performed in a sequence of a primary component carrier, a 20 MHz secondary component carrier, a 40 MHz secondary component carrier, and an 80 MHz secondary component carrier. According to this sequence, an access point (AP) or user equipment contends for a next carrier only when a previous carrier in the sequence is allowed to be accessed and used, and finally, carriers allowed to be accessed are combined together to form a channel with a high bandwidth to transmit data.

In the mechanism of contention-based access to a carrier that is performed according to priorities, if an AP or user equipment fails in contending for a carrier with a high priority, the AP or the user equipment gives up contending for a carrier with a low priority. As a result, a carrier with a lower priority is not fully used, load of carriers is not balanced, and a utilization rate of carriers with a low priority is reduced.

SUMMARY

Embodiments of the present disclosure provide a multi-carrier aggregation method and apparatus, user equipment, and a network side device, which can improve a utilization rate of a carrier, and in particular, that of a carrier with a low priority.

According to a first aspect, a multi-carrier aggregation method is provided, including:

determining, by a network side device according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and performing, by the network side device, downlink transmission with user equipment in the downlink phase of the scheduling phase, and performing, by the network side device, uplink transmission with the user equipment in the uplink phase of the scheduling phase.

According to a second aspect, a multi-carrier aggregation method is provided, including:

performing, by user equipment, downlink transmission with the network side device in a downlink phase of a scheduling phase, and performing uplink transmission with the network side device in an uplink phase of the scheduling phase, where start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time.

According to a third aspect, a multi-carrier aggregation apparatus is provided, including:

a first determining unit, configured to determine, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time;

a first downlink transmission unit, configured to perform downlink transmission with user equipment in the downlink phase of the scheduling phase that is determined by the first determining unit; and a first uplink transmission unit, configured to perform uplink transmission with the user equipment in the uplink phase of the scheduling phase that is determined by the first determining unit.

According to a fourth aspect, a multi-carrier aggregation apparatus is provided, including:

a second downlink transmission unit, configured to perform downlink transmission with the network side device by using a downlink transmission resource within a downlink phase of a scheduling phase; and a second uplink transmission unit, configured to perform uplink transmission with the network side device by using an uplink transmission resource within an uplink phase of the scheduling phase, where start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time.

According to a fifth aspect, a network side device is provided, including a processor and a transceiver, where the processor is configured to determine, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and the transceiver is configured to perform downlink transmission with user equipment in the downlink phase of the scheduling phase that is determined by the processor, and perform uplink transmission with the user equipment in the uplink phase of the scheduling phase that is determined by the processor.

According to a sixth aspect, user equipment is provided, including a transceiver, where the transceiver is configured to perform downlink transmission with a network side device in a downlink phase of a scheduling phase, and perform uplink transmission with the network side device in an uplink phase of the scheduling phase, where start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time.

In the embodiments, a network side device determines, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and the network side device performs downlink transmission with user equipment in the downlink phase of the scheduling phase, and the network side device performs uplink transmission with the user equipment in the uplink phase of the scheduling phase. In the embodiments, component carriers do not have a priority relationship in contention-based access, so that the component carriers have equal opportunities of being accessed, and load of the component carriers is balanced, thereby improving a utilization rate of a carrier with a low priority in the prior art.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a diagram of the principle of carrier aggregation in the prior art;

FIG. 2 is a schematic diagram of requirements of services of different types in the prior art;

DESCRIPTION OF EMBODIMENTS

Figure 3:
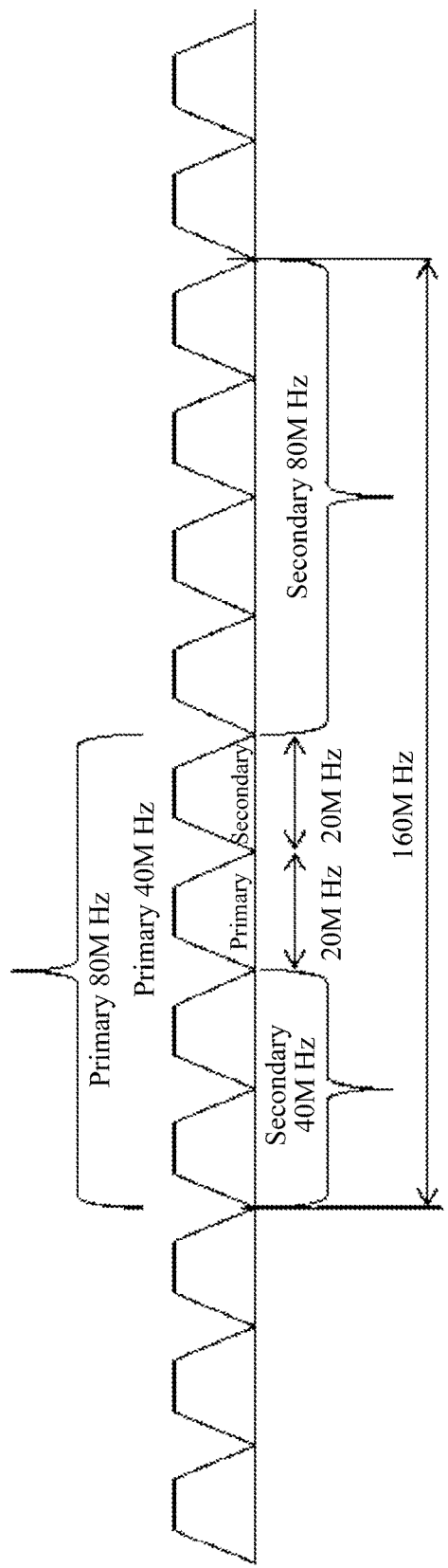
FIG. 3 is a schematic diagram of carrier aggregation in the prior art.

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, frequency band resources of a communications system are divided into several component carriers (CC), and bandwidths of all the component carriers are changeable.

The following describes time division of a component carrier in an embodiment of the present disclosure. As shown in FIG. 4A, a time of each component carrier is divided by an uplink-downlink switch point into an uplink time of the component carrier and a downlink time of the component carrier, and uplink-downlink switch points of different component carriers are consistent in time, that is, the uplink-downlink switch points of the component carriers are aligned at times. For example, in FIG. 4A (where in FIG. 4A, an uplink-downlink switch point is referred to as a switch point for short), a component carrier 1 includes a switch point 11 to a switch point 15, a component carrier 2 includes a switch point 21 to a switch point 25, a component carrier 3 includes a switch point 31 to a switch point 35, and a component carrier 4 includes a switch point 41 to a switch point 45. The switch point 11, the switch point 21, the switch point 31, and the switch point 41 are all at a time point t1; therefore, these switch points are consistent in time, which may also be referred to as aligned in time. Similarly, the switch point 12, the switch point 22, the switch point 32, and the switch point 42 are all at a time point t2; therefore, these switch points are also consistent in time. This analogy is also applicable to other switch points, and details are not described herein again. In addition, a time between the switch point 11 and the switch point 12, a time between the switch point 21 and the switch point 22, a time between the switch point 31 and the switch point 32, and a time between the switch point 41 and the switch point 42 are uplink times of the component carriers 1 to 4, respectively; and a time between the switch point 12 and the switch point 13, a time between the switch point 22 and the switch point 23, a time between the switch point 32 and the switch point 33, and a time between the switch point 42 and the switch point 43 are downlink times of the component carriers 1 to 4, respectively.

Generally, time lengths of an uplink time and a downlink time of a component carrier are the same, that is, two neighboring time lengths between uplink-downlink switch points are the same. Specific values of the time lengths may be autonomously set, and the values may be updated and modified in actual application, which is not limited herein. However, time lengths of an uplink time and a downlink time of a component carrier may also be different, which is not limited in this embodiment of the present disclosure.

Within an uplink time of a component carrier, a network side device can schedule user equipment to use each idle component carrier to send uplink service data to the network side device; and within a downlink time of a component carrier, the network side device can schedule the network side device to use each idle component carrier to send downlink service data to each user equipment.

In addition, in this embodiment of the present disclosure, data transmission on each component carrier is also contention-based, for example, contention is performed by using a CSMA/CA mechanism in the prior art, that is, an opportunity of sending data is obtained through contention. A scheduling phase (SP) may be a phase, obtained through contention for performing uplink or downlink transmission, on a component carrier, and a contention phase (CP) may be a phase, on a component carrier, except a scheduling phase. Certainly, a scheduling phase and a contention phase may also be referred to using other names, which also falls within the protection scope of the present disclosure. For example, in FIG. 4A, SP1 to SP4 are separately scheduling phases, and CP1 to CP9 are separately contention phases.

The scheduling phase may be obtained by a network side device through contention in a downlink time of the component carrier, or may be obtained by a network side device through contention in an uplink time of the component carrier. All phases or some phases of the scheduling phase may be released after the scheduling phase is successfully obtained through contention. The scheduling phase is also divided by the uplink-downlink switch point into an uplink phase of the scheduling phase and a downlink phase of the scheduling phase, where a transmission resource within the uplink phase of the scheduling phase corresponds to an uplink transmission resource, a transmission resource within the downlink phase of the scheduling phase corresponds to a downlink transmission resource, and the uplink and downlink phases of the scheduling phase are all or a part of uplink and downlink times of the component carrier. The downlink transmission resource within the downlink phase of the scheduling phase is used to perform downlink transmission between the network side device and user equipment, and the uplink transmission resource within the uplink phase of the scheduling phase is used to perform uplink transmission between the user equipment and the network side device. For example, as shown in FIG. 4A, a scheduling phase SP1 corresponds to the component carriers 1 and 2, and is divided by the switch point 12 and the switch point 22 into uplink phases and downlink phases; and a scheduling phase SP2 corresponds to the component carrier 1, and is divided by the switch point 14 into an uplink phase and a downlink phase.

In this embodiment of the present disclosure, the transmission resource such as the uplink transmission resource within the uplink phase or the downlink transmission resource within the downlink phase may be a transmission resource in a space domain, a time domain, a frequency domain, and/or a code domain, which is not limited in this embodiment of the present disclosure.

In this embodiment of the present disclosure, the so-called network side device may be an AP, a base station, or the like, which is not limited herein.

Figure 4:
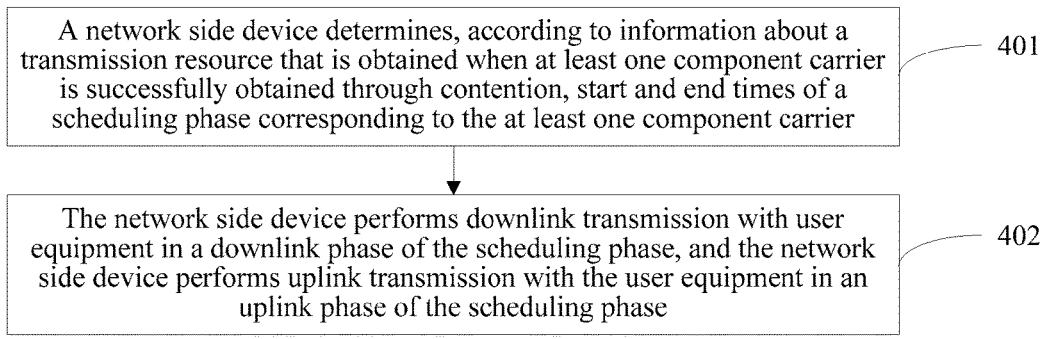
FIG. 4 is a schematic diagram of a first embodiment of a multi-carrier aggregation method according to the present disclosure.
Figure 4A:
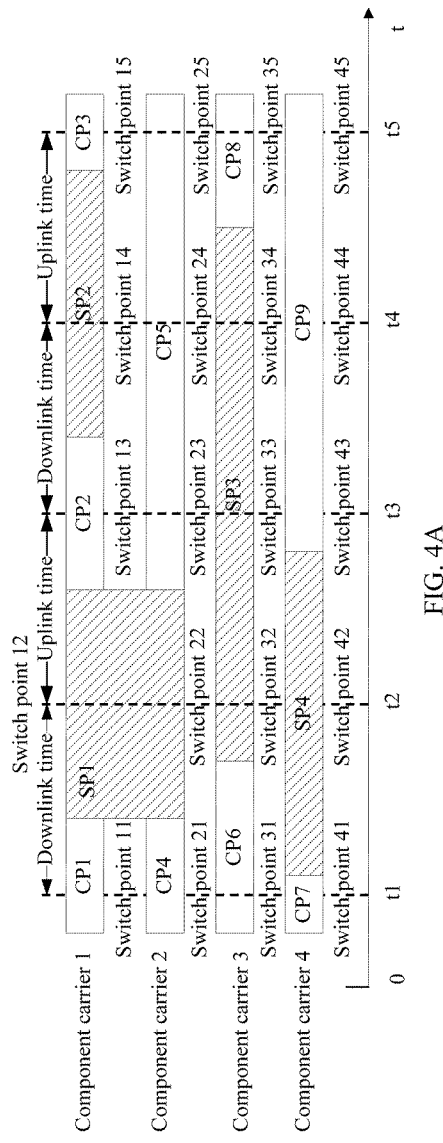
FIG. 4A is a schematic diagram of time division of a component carrier according to the present disclosure.

Referring to FIG. 4, FIG. 4 is a schematic diagram of a first embodiment of a multi-carrier aggregation method according to the present disclosure. The method includes:

Step 401: A network side device determines, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and when the at least one component carrier is two or more component carriers, uplink-downlink switch points of the two or more component carriers are aligned in time.

Step 402: The network side device performs downlink transmission with user equipment in the downlink phase of the scheduling phase, and the network side device performs uplink transmission with the user equipment in the uplink phase of the scheduling phase.

In this embodiment, component carriers do not have a priority relationship in contention-based access, so that the component carriers have equal opportunities of being accessed, and load of the component carriers is balanced, thereby improving a utilization rate of a carrier, and in particular, that of a carrier with a low priority in the prior art.

Figure 5:
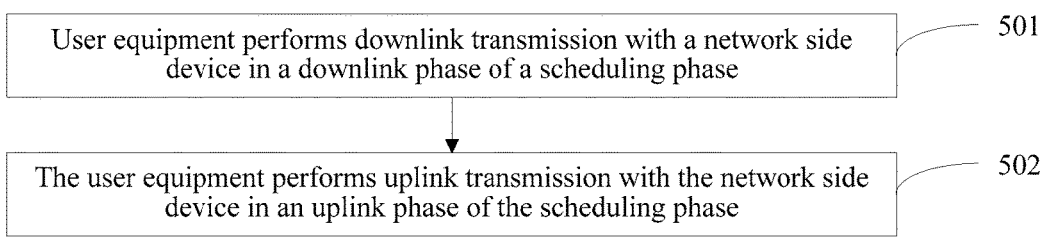
FIG. 5 is a schematic diagram of a second embodiment of a multi-carrier aggregation method according to the present disclosure.

Referring to FIG. 5, FIG. 5 is a schematic diagram of a second embodiment of a multi-carrier aggregation method according to the present disclosure. The method includes:

Step 501: User equipment performs downlink transmission with the network side device in a downlink phase of a scheduling phase.

Step 502: The user equipment performs uplink transmission with the network side device in an uplink phase of the scheduling phase.

Start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, and the uplink-downlink switch point is used to divide a time to obtain an uplink time of the component carrier and a downlink time of the component carrier.

When the at least one component carrier includes two or more component carriers, uplink-downlink switch points of the two or more component carriers are aligned in time.

A sequence of performing step 501 and step 502 is not restricted, and is related to a time sequence of the uplink phase and the downlink phase of the scheduling phase. For example, as shown in FIG. 4A, a scheduling phase SP3 corresponding to a component carrier 3 is divided by switch points 31, 32, 33, 34, and 35 into multiple uplink phases and downlink phases. The user equipment performs step 501 in a downlink phase, between the switch point 31 and the switch point 32, of the scheduling phase SP3; then performs step 502 in an uplink phase, between the switch point 32 and the switch point 33, of the scheduling phase SP3; then performs step 501 in a downlink phase, between the switch point 33 and the switch point 34, of the scheduling phase SP3; and finally performs step 502 in an uplink phase, between the switch point 34 and the switch point 35, of the scheduling phase SP3, and so on.

In this embodiment, user equipment performs downlink transmission with the network side device in a downlink phase of a scheduling phase, and performs uplink transmission with the network side device in an uplink phase of the scheduling phase, to cooperate with the network side device to implement uplink and downlink transmission with the network side device, thereby improving a utilization rate of a component carrier.

Figure 6:
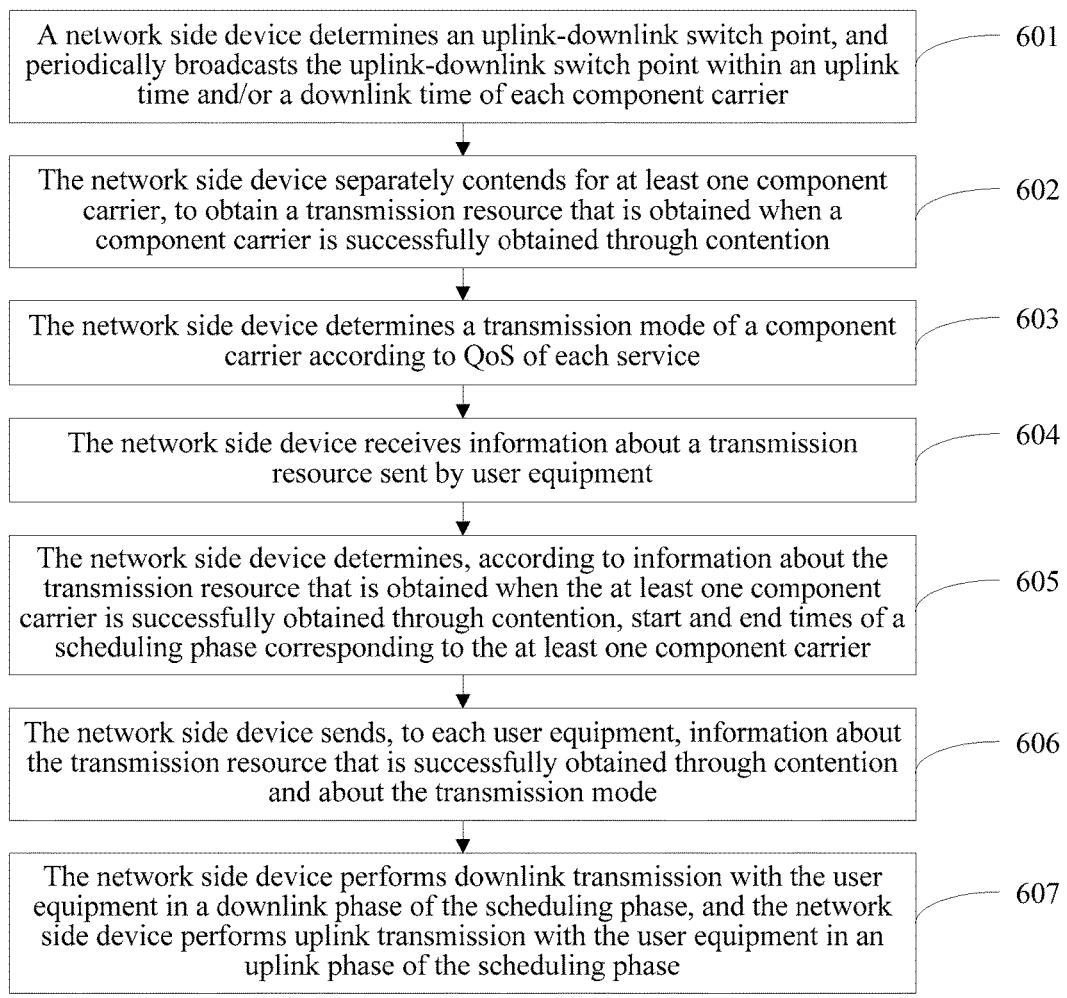
FIG. 6 is a schematic diagram of a third embodiment of a multi-carrier aggregation method according to the present disclosure.

Referring to FIG. 6, FIG. 6 is a schematic diagram of a third embodiment of a multi-carrier aggregation method according to the present disclosure. The method includes:

Step 601: A network side device determines an uplink-downlink switch point, and periodically broadcasts the uplink-downlink switch point within an uplink time and/or a downlink time of each component carrier.

The network side device broadcasts the uplink-downlink switch point to each user equipment, so that division of uplink and downlink times of a component carrier is synchronous between the network side device and the user equipment.

A specific length of a period in which the uplink-downlink switch point is broadcast can be autonomously set in actual application, which is not limited in the present disclosure.

Generally, the network side device may perform step 601 only once within a time period to determine all uplink-downlink switch points within the time period, and periodically broadcast the uplink-downlink switch point to each user equipment.

How the network side device specifically broadcasts the uplink-downlink switch point to each user equipment is not limited in the present disclosure, for example, the uplink-downlink switch point may be broadcast by using a self-defined frame.

Step 602: The network side device separately contends for at least one component carrier, to obtain a transmission resource when a component carrier is successfully obtained through contention.

The at least one component carrier that the network side device contends for may be a component carrier that the network side device senses and that can be aggregated. When the network side device separately contends for the component carrier that is sensed and that can be aggregated, contention may be implemented based on an existing CSMA/CA contention mechanism, which is not limited herein. The network side device may determine, by sensing a network allocation vector (NAV) or detecting received signal energy, whether a component carrier is successfully obtained through contention, where the NAV is sent when the network side device or the user equipment successfully obtains a component carrier through contention.

Step 603. The network side device determines a transmission mode of the component carrier according to QoS of each service.

The transmission mode may include: a scheduling-based transmission mode and a contention-based transmission mode. A specific transmission method of the contention-based transmission mode may be implemented based on the existing CSMA/CA contention mechanism, to be compatible with the prior art. For example, when the network side device determines to use the contention-based transmission mode, the network side device determines start and end times of a transmit opportunity (TXOP) of contention-based transmission, where the start and end times of the TXOP are located within the downlink time of the component carrier, and the network side device performs downlink transmission with the user equipment by using the TXOP. The following no longer describes the contention-based transmission mode in excessive detail, and describes, by using the following steps 605 to 607, a processing process that is performed by the network side device when the network side device determines that the transmission mode of the component carrier is the scheduling-based transmission mode.

Services may include an uplink service and a downlink service, where QoS of the downlink service may be directly determined by the network side device, and QoS of the uplink service may be reported to the network side device by user equipment corresponding to the uplink service. How the network side device specifically determines QoS of each service is not described in detail herein.

Step 603 is an optional step.

Step 604. The network side device receives information about a transmission resource sent by user equipment, where the information about the transmission resource includes: information about a transmission resource that the user equipment obtains when at least one component carrier is successfully obtained through contention.

For details about how the user equipment contends for a component carrier, reference may be made to the description about contending for a component carrier by the network side device in step 602, and details are not described herein again.

In addition, the user equipment may also determine, by sensing a NAV or detecting received signal energy, whether a component carrier is successfully obtained through contention, where the NAV is sent when the network side device or the user equipment successfully obtains a component carrier through contention.

Step 605. The network side device determines, according to information about the transmission resource that is obtained when the at least one component carrier is successfully obtained through contention, start and end times of a scheduling phase corresponding to the at least one component carrier.

The transmission resource indicated by the information about the transmission resource that is obtained when the at least one component carrier is successfully obtained through contention may include: the transmission resource that is obtained by the network side device when the component carrier is successfully obtained through contention in step 602, and/or the transmission resource that is sent by the user equipment and that is obtained by the user equipment when the component carrier is successfully obtained through contention in step 604, which is not limited in the present disclosure.

When the transmission resource indicated by the information about the transmission resource that is obtained when the at least one component carrier is successfully obtained through contention includes: only the transmission resource that is obtained by the network side device when the component carrier is successfully obtained through contention in step 602, step 604 may not be performed; and when the transmission resource indicated by the information about the transmission resource that is obtained when the at least one component carrier is successfully obtained through contention includes: only the transmission resource that is sent by the user equipment and that is obtained by the user equipment when the component carrier is successfully obtained through contention in step 604, step 602 may not be performed.

The determining, by the network side device according to information about the transmission resource that is obtained when the at least one component carrier is successfully obtained through contention, start and end times of a scheduling phase corresponding to the at least one component carrier may include:

determining, by the network side device according to the information about the transmission resource that is obtained when the at least one component carrier is successfully obtained through contention, the start time of the scheduling phase;

determining, by the network side device, duration of the scheduling phase; and determining, by the network side device, the start and end times of the scheduling phase according to the start time and the duration of the scheduling phase.

In a possible implementation manner, the determining, by the network side device according to the information about the transmission resource that is obtained when the at least one component carrier is successfully obtained through contention, the start time of the scheduling phase may include:

determining, by the network side device, the start time of the scheduling phase according to a time at which a first component carrier is successfully obtained through contention and according to a first preset time, for example, using, by the network side device, as the start time of the scheduling phase, a time that is obtained after the time at which the network side device successfully obtains the first component carrier through contention goes by the first preset time.

For example, the network side device separately contends for component carriers 1, 2, 3, and 4, and first successfully obtains the component carrier 2 through contention, and in this case, the first component carrier is the component carrier 2, and the time at which the first component carrier is successfully obtained through contention is a time at which the component carrier 2 is successfully obtained through contention.

A specific value of the first time may be autonomously set in actual application, which is not limited in the present disclosure.

In another possible implementation manner, the determining, by the network side device according to the information about the transmission resource that is obtained when the at least one component carrier is successfully obtained through contention, the start time of the scheduling phase may include:

determining, by the network side device, the start time of the scheduling phase according to a time at which information about a transmission resource reported by first user equipment is received and according to a second preset time, for example, using, by the network side device, as the start time of the scheduling phase, a time that is obtained after the time at which the network side device receives the information about the transmission resource reported by the first user equipment goes by the second preset time.

For example, the network side device receives information about a transmission resource separately reported by user equipments A, B, and C, where the information about the transmission resource reported by the user equipment C is first received, and in this case, the first user equipment is the user equipment C, and the time at which the network side device receives the information about the transmission resource reported by the first user equipment is a time at which the network side device receives the information about the transmission resource reported by the user equipment C.

A specific value of the second time may be autonomously set in actual application, which is not limited in the present disclosure.

The determining, by the network side device, duration of the scheduling phase may include:

using, by the network side device, a third preset time as the duration of the scheduling phase; or determining, by the network side device, the duration of the scheduling phase according to a service volume and/or QoS of a service, where the service may be a service that the network side device needs to transmit within the scheduling phase.

A specific value of the third time may be autonomously set in actual application, which is not limited in the present disclosure.

The following uses an example to describe implementation of the determining, by the network side device, the duration of the scheduling phase according to a service volume and/or quality of service QoS of a service:

A calculation formula of the duration of the scheduling phase may be: Duration=Constant factor×Service volume÷QoS, where which parameters are used to indicate the service volume and the QoS may be autonomously set in actual application, which is not limited herein, and a specific value of the constant factor may be autonomously set in actual application, which is not limited herein. For example, the duration of the scheduling phase may be obtained by dividing maximum duration T of a non-authorized frequency band stipulated by a frequency spectrum management organization by a product of a data packet latency and a data error rate, where the maximum duration T of the non-authorized frequency band is duration related to a service volume of a service, and the data packet latency and the data error rate are used to indicate QoS of the service.

The foregoing method for determining the duration is only exemplary, and in actual application, the duration of the scheduling phase may also be determined by using another method, which is not limited herein.

The scheduling phase corresponding to the at least one component carrier is divided by the uplink-downlink switch point into an uplink phase and a downlink phase. Correspondingly, a transmission resource within the scheduling phase corresponding to the at least one component carrier is also divided by the uplink-downlink switch point into an uplink transmission resource within the uplink phase of the scheduling phase and a downlink transmission resource within the downlink phase of the scheduling phase. The uplink transmission resource within the uplink phase of the scheduling phase corresponding to the at least one component carrier includes: a transmission resource, of each component carrier in the at least one component carrier, within the uplink phase; and the downlink transmission resource within the downlink phase of the scheduling phase corresponding to the at least one component carrier includes: a transmission resource, of each component carrier in the at least one component carrier, within the downlink phase. For example, in FIG. 4A, a scheduling phase SP1 corresponding to component carriers 1 and 2 is divided by a switch point 12 and a switch point 22 into an uplink phase and a downlink phase. Uplink transmission resources within the uplink phase of the scheduling phase SP1 include: a transmission resource, of the component carrier 1, within the uplink phase of the scheduling phase SP1, and a transmission resource, of the component carrier 2, within the uplink phase of the scheduling phase SP1. Downlink transmission resources within the downlink phase of the scheduling phase SP1 include: a transmission resource, of the component carrier 1, within the downlink phase of the scheduling phase SP1, and a transmission resource, of the component carrier 2, within the downlink phase of the scheduling phase SP1.

A transmission resource, of each component carrier in the at least one component carrier, within an uplink phase of a scheduling phase may include: at least one uplink resource block, and when the network side device performs uplink transmission with the user equipment in a subsequent step, the network side device may perform uplink transmission by using one or more uplink resource blocks on the at least one component carrier. A transmission resource, of each component carrier in the at least one component carrier, within a downlink phase of a scheduling phase may include: at least one downlink resource block, and when the network side device performs downlink transmission with the user equipment in a subsequent step, the network side device may perform downlink transmission by using one or more downlink resource blocks on the at least one component carrier. For specific implementation, refer to related description in step 607, and details are not described herein.

If the transmission resource in this embodiment of the present disclosure is a transmission resource in a time domain, the uplink resource block or the downlink transmission block may be implemented in a form of a time slice, and specific division of a time slice may be implemented by using a time division multiple access (TDMA) technology but without being limited thereto.

If the transmission resource in this embodiment of the present disclosure is a transmission resource in a time domain and a frequency domain, the uplink resource block or the downlink transmission block may be implemented in a form of a time-frequency resource block, and division of a time-frequency resource block may be implemented by using an orthogonal frequency division multiple access (OFDMA) technology but without being limited thereto.

In addition, if the transmission resource in this embodiment of the present disclosure is a transmission resource in a frequency domain, the uplink resource block or the downlink transmission block may be implemented in a form of a frequency resource block; if the transmission resource in this embodiment of the present disclosure is a transmission resource in a space domain, the uplink resource block or the downlink transmission block may be implemented in a form of a space resource block; if the transmission resource in this embodiment of the present disclosure is a transmission resource in a code domain, the uplink resource block or the downlink transmission block may be implemented in a form of a code resource block; if the transmission resource in this embodiment of the present disclosure is a transmission resource in a time domain and a space domain, the uplink resource block or the downlink transmission block may be implemented in a form of a space-time resource block; if the transmission resource in this embodiment of the present disclosure is a transmission resource in a frequency domain and a space domain, the uplink resource block or the downlink transmission block may be implemented in a form of a space-frequency resource block; and if the transmission resource in this embodiment of the present disclosure is a transmission resource in a frequency domain, a space domain, and a time domain, the uplink resource block or the downlink transmission block may be implemented in a form of a space-time-frequency resource block.

Step 606. The network side device sends, to each user equipment, information about the transmission resource that is successfully obtained through contention and about the transmission mode.

Specifically, the network side device may send, to each user equipment, the information about the transmission resource that is successfully obtained through contention and about the transmission mode by using a Media Access Control (MAC) layer message.

Step 606 is an optional step, and a sequence of performing step 605 and step 606 is not restricted.

Step 607: The network side device performs downlink transmission with the user equipment in a downlink phase of the scheduling phase, and the network side device performs uplink transmission with the user equipment in an uplink phase of the scheduling phase.

If an uplink transmission resource within the uplink phase of the scheduling phase corresponding to the at least one component carrier includes at least one uplink resource block, the performing, by the network side device, uplink transmission with the user equipment in an uplink phase of the scheduling phase may include:

allocating, by the network side device to the user equipment, the at least one uplink resource block that is of the uplink transmission resource within the uplink phase of the scheduling phase and that is on the at least one component carrier; and sending, by the network side device to the user equipment, information about the at least one uplink resource block that is allocated to the user equipment and that is on the at least one component carrier, so that the user equipment performs uplink transmission with the network side device on the corresponding component carrier by using the uplink resource block that is allocated to the user equipment.

The allocating, by the network side device to the user equipment, the at least one uplink resource block that is of the uplink transmission resource within the uplink phase of the scheduling phase and that is on the at least one component carrier may include:

determining, by the network side device, a sequence in which transmission resources are allocated to user equipments; and sequentially allocating, by the network side device to each user equipment in the determined sequence, the at least one uplink resource block that is of the uplink transmission resource within the uplink phase of the scheduling phase and that is on the at least one component carrier.

The network side device may allocate an uplink resource block to each user equipment according to a service volume of an uplink service that the user equipment needs to transmit to the network side device, or may perform determining according to a preset quantity of uplink resource blocks, which is not limited in the present disclosure.

If a downlink transmission resource within the downlink phase of the scheduling phase corresponding to the at least one component carrier includes at least one downlink resource block, the performing, by the network side device, downlink transmission with the user equipment in a downlink phase of the scheduling phase may include:

allocating, by the network side device to the user equipment, the at least one downlink resource block that is of the downlink transmission resource within the downlink phase of the scheduling phase and that is on the at least one component carrier;

sending, by the network side device to the user equipment, information about the at least one downlink resource block that is allocated to the user equipment and that is on the at least one component carrier; and performing, by the network side device, downlink transmission with the user equipment on the component carrier by using the downlink resource block that is allocated to the user equipment.

The allocating, by the network side device to the user equipment, the at least one downlink resource block that is of the downlink transmission resource within the downlink phase of the scheduling phase and that is on the at least one component carrier may include:

determining, by the network side device, a sequence in which transmission resources are allocated to user equipments; and sequentially allocating, by the network side device to each user equipment in the determined sequence, the at least one downlink resource block that is of the downlink transmission resource within the downlink phase of the scheduling phase and that is on the at least one component carrier.

The network side device may allocate a downlink resource block to each user equipment according to a service volume of a downlink service that the network side device transmits to the user equipment, or may perform determining according to a preset quantity of downlink resource blocks, which is not limited in the present disclosure.

When determining the sequence in which resources are allocated to the user equipments, the network side device may perform determining according to whether the user equipments report information about a transmission resource, and/or priorities of the user equipments, and/or volumes of services to be transmitted by the user equipments, and/or a sequence of serial numbers of the user equipments. Specifically, user equipment that has reported information about a transmission resource is prior to, in sequence, user equipment that has not reported information about a transmission resource; user equipment with a higher priority is prior to, in sequence, user equipment with a lower priority; user equipment that has a larger service volume is prior to, in sequence, user equipment that has a smaller service volume; and user equipment that has a smaller serial number is prior to, in sequence, user equipment that has a larger serial number. In actual application, how the network side device specifically determines, according to the foregoing sorting conditions, the sequence in which resources are allocated to the user equipments is not limited in the present disclosure. For example, in a polling scheduling algorithm, a sequence in which transmission resources are allocated to user equipments is determined according to serial numbers of the user equipments, and further, a sequence of serial numbers of the user equipments may be further adjusted according to whether the user equipments have reported information about a transmission resource, thereby determining the sequence in which transmission resources are allocated to the user equipments. In a proportional fair scheduling algorithm, a sequence in which transmission resources are allocated to user equipments is determined according to priorities of the user equipments, and further, the priorities of the user equipments may be adjusted according to whether the user equipments have reported information about a transmission resource (for example, a priority of user equipment that has reported information about a transmission resource is multiplied by a constant factor greater than 1, so that the priority of the user equipment that has reported information about a transmission resource is improved), thereby determining the sequence in which transmission resources are allocated to the user equipments; and so on.

In this embodiment, in contention-based access to a component carrier, a network side device no longer performs contention-based access according to a priority of a component carrier; therefore, component carriers have equal opportunities of being accessed, and load of the component carriers is balanced, thereby improving a utilization rate of a carrier with a low priority in the prior art. In addition, the network side device allocates different component carriers and different uplink resource blocks to user equipments for uplink transmission, and allocates different component carriers and different downlink resource blocks to the user equipments for downlink transmission; and overall configuration based on one bandwidth is no longer performed, so that allocation of a component carrier and a transmission resource on the component carrier becomes more flexible, thereby improving a utilization rate of a component carrier from another perspective and reducing bandwidth waste.

Figure 7:
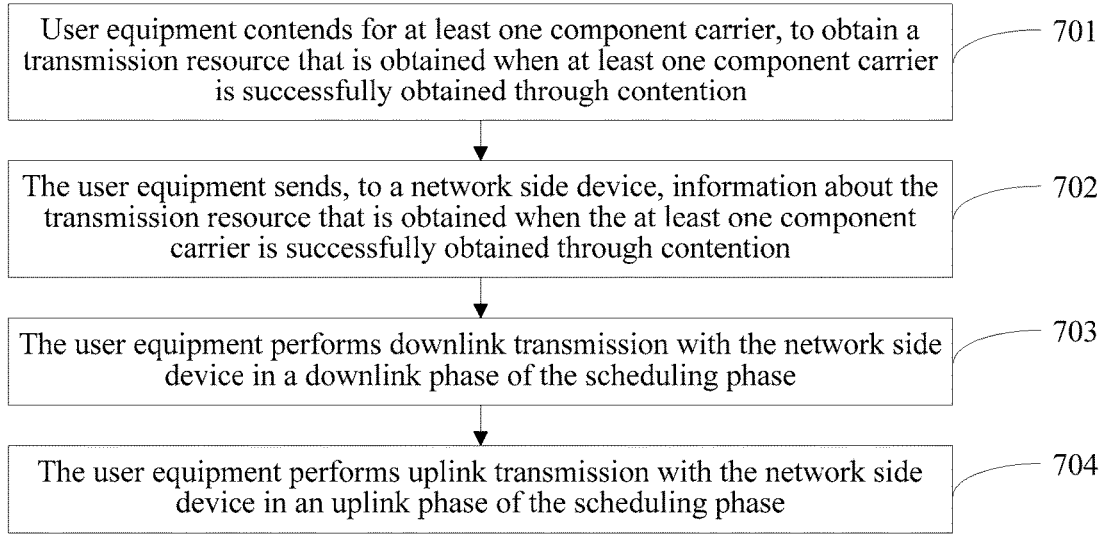
FIG. 7 is a schematic diagram of a fourth embodiment of a multi-carrier aggregation method according to the present disclosure.

Referring to FIG. 7, FIG. 7 is a schematic diagram of a fourth embodiment of a multi-carrier aggregation method according to the present disclosure. The method includes:

Step 701: User equipment contends for at least one component carrier, to obtain a transmission resource when at least one component carrier is successfully obtained through contention.

The user equipment may determine, by sensing a NAV or detecting received signal energy, whether a component carrier is successfully obtained through contention, where the NAV is sent when a network side device or the user equipment successfully obtains a component carrier through contention.

Step 702: The user equipment sends, to a network side device, information about the transmission resource that is obtained when the at least one component carrier is successfully obtained through contention, so that the network side device determines start and end times of a scheduling phase according to the information about the transmission resource that is obtained when the at least one component carrier is successfully obtained through contention.

Step 703: The user equipment performs downlink transmission with the network side device in a downlink phase of the scheduling phase.

The performing, by the user equipment, downlink transmission with the network side device in a downlink phase of the scheduling phase may include:

receiving, by the user equipment, at least one downlink resource block that is sent by the network side device and allocated to the user equipment and that is on the at least one component carrier; and performing, by the user equipment, downlink transmission with the network side device on the corresponding component carrier by using the downlink resource block that is allocated to the user equipment.

Step 704: The user equipment performs uplink transmission with the network side device in an uplink phase of the scheduling phase.

The performing, by the user equipment, uplink transmission with the network side device in an uplink phase of the scheduling phase may include:

receiving, by the user equipment, information, sent by the network side device, about at least one uplink resource block that is allocated to the user equipment and that is on the at least one component carrier; and performing, by the user equipment, uplink transmission with the network side device on the corresponding component carrier by using the uplink resource block that is allocated to the user equipment.

Referring to the description of the sequence of performing step 501 and step 502 in FIG. 5, a sequence of performing step 703 and step 704 is not fixed either.

In this embodiment, user equipment performs downlink transmission with the network side device in a downlink phase of a scheduling phase, and performs uplink transmission with the network side device in an uplink phase of the scheduling phase, to cooperate with the network side device to implement uplink and downlink transmission with the network side device, thereby improving a utilization rate of a component carrier.

Figure 8:
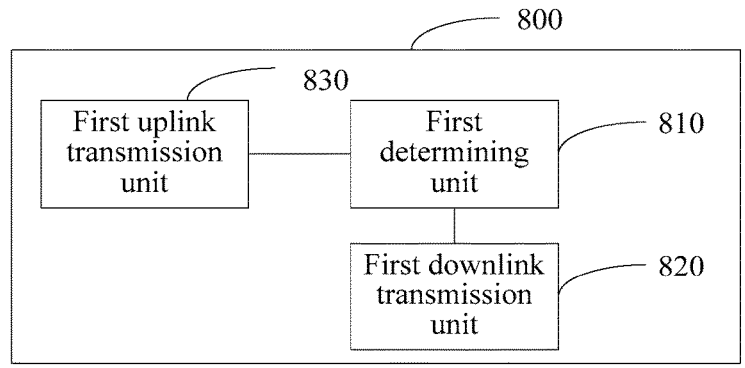
FIG. 8 is a schematic diagram of a first embodiment of a multi-carrier aggregation apparatus according to the present disclosure.

Refer to FIG. 8, FIG. 8 is a structural diagram of a first embodiment of a multi-carrier aggregation apparatus according to the present disclosure, where the apparatus may be disposed in a network side device. As shown in FIG. 8, the apparatus 800 includes:

a first determining unit 810, configured to determine, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time;

a first downlink transmission unit 820, configured to perform downlink transmission with user equipment in the downlink phase of the scheduling phase that is determined by the first determining unit 810; and a first uplink transmission unit 830, configured to perform uplink transmission with the user equipment in the uplink phase of the scheduling phase that is determined by the first determining unit 810.

Optionally, the first determining unit 810 may include:

a first determining subunit, configured to determine, according to the information about the transmission resource that is obtained when the at least one component carrier is successfully obtained through contention, the start time of the scheduling phase;

a second determining subunit, configured to determine duration of the scheduling phase; and a third determining subunit, configured to determine the start and end times of the scheduling phase according to the start time and the duration of the scheduling phase.

Optionally, the first determining subunit may be specifically configured to:

determine the start time of the scheduling phase according to a time at which a first component carrier is successfully obtained through contention and according to a first preset time; or determine the start time of the scheduling phase according to a time at which information about a transmission resource reported by first user equipment is received and according to a second preset time.

Optionally, the second determining subunit may be specifically configured to use a third preset time as the duration of the scheduling phase; or determine the duration of the scheduling phase according to a service volume and/or quality of service QoS of a service that is transmitted within the scheduling phase.

Optionally, the second determining subunit may be specifically configured to calculate the duration of the scheduling phase by using a formula T/(Data packet latency*Data error rate), where T is maximum duration of an unauthorized frequency band, and * indicates multiplication.

Optionally, an uplink transmission resource within the uplink phase of the scheduling phase corresponding to the at least one component carrier includes at least one uplink resource block, and the first uplink transmission unit 830 may include:

a first allocation subunit, configured to allocate, to the user equipment, the at least one uplink resource block that is of the uplink transmission resource within the uplink phase of the scheduling phase and that is on the at least one component carrier; and a first sending subunit, configured to send, to the user equipment, information about the at least one uplink resource block that is allocated to the user equipment and that is on the at least one component carrier, so that the user equipment performs uplink transmission with the network side device on the corresponding component carrier by using the uplink resource block that is allocated to the user equipment.

Optionally, the first allocation subunit may include:

a determining module, configured to determine a sequence in which transmission resources are allocated to user equipments; and a first allocation module, configured to sequentially allocate, to each user equipment in the determined sequence, the at least one uplink resource block that is of the uplink transmission resource within the uplink phase of the scheduling phase and that is on the at least one component carrier.

Optionally, a downlink transmission resource within the downlink phase of the scheduling phase corresponding to the at least one component carrier includes at least one downlink resource block, and the first downlink transmission unit 820 may include:

a second allocation subunit, configured to allocate, to the user equipment, the at least one downlink resource block that is of the downlink transmission resource within the downlink phase of the scheduling phase and that is on the at least one component carrier;

a second sending subunit, configured to send, to the user equipment, information about the at least one downlink resource block that is allocated to the user equipment and that is on the at least one component carrier; and a first downlink transmission subunit, configured to perform downlink transmission with the user equipment on the component carrier by using the downlink resource block that is allocated to the user equipment.

Optionally, the second allocation subunit may include:

a determining module, configured to determine a sequence in which transmission resources are allocated to user equipments; and a second allocation module, configured to sequentially allocate, to each user equipment in the determined sequence, the at least one downlink resource block that is of the downlink transmission resource within the downlink phase of the scheduling phase and that is on the at least one component carrier.

Optionally, the determining module may be specifically configured to:

determine, according to whether the user equipments report a transmission resource that is successfully obtained through contention, and/or priorities of the user equipments, and/or volumes of services to be transmitted by the user equipments, and/or a sequence of serial numbers of the user equipments, the sequence in which resources are allocated to users.

Optionally, the first determining unit 810 may be further configured to determine the uplink-downlink switch point, and periodically broadcast the uplink-downlink switch point within the uplink time, or the downlink time, or the uplink time and the downlink time of the component carrier.

Optionally, the apparatus may further include:

a contention unit, configured to contend for at least one component carrier, to obtain a transmission resource when at least one component carrier is successfully obtained through contention, and send information of the obtained transmission resource to the first determining unit.

Optionally, the first uplink transmission unit 830 may be further configured to receive information that is sent by the user equipment and that is about a transmission resource that is obtained when at least one component carrier is successfully obtained through contention, and send the information about the transmission resource to the first determining unit.

Optionally, the contention unit may be specifically configured to determine, by sensing a network allocation vector NAV or detecting received signal energy, whether a component carrier is successfully obtained through contention, where the NAV is sent when the network side device or the user equipment successfully obtains a component carrier through contention.

Optionally, the apparatus may further include:

a second determining unit, configured to: determine, according to QoS of each service, whether a transmission mode of a component carrier is a scheduling-based transmission mode or a contention-based transmission mode; and when it is determined that the transmission mode is the contention-based transmission mode, control the first determining unit to perform processing of the determining start and end times of a scheduling phase.

In this embodiment, component carriers do not have a priority relationship in contention-based access, so that the component carriers have equal opportunities of being accessed, and load of the component carriers is balanced, thereby improving a utilization rate of a carrier with a low priority in the prior art and reducing bandwidth waste. In addition, a network side device allocates different component carriers and different uplink resource blocks to user equipments for uplink transmission, and allocates different component carriers and different downlink resource blocks to the user equipments for downlink transmission; and overall configuration based on one bandwidth is no longer performed, so that allocation of a component carrier and a transmission resource on the component carrier becomes more flexible, thereby improving a utilization rate of a component carrier from another perspective, and reducing bandwidth waste.

Figure 9:
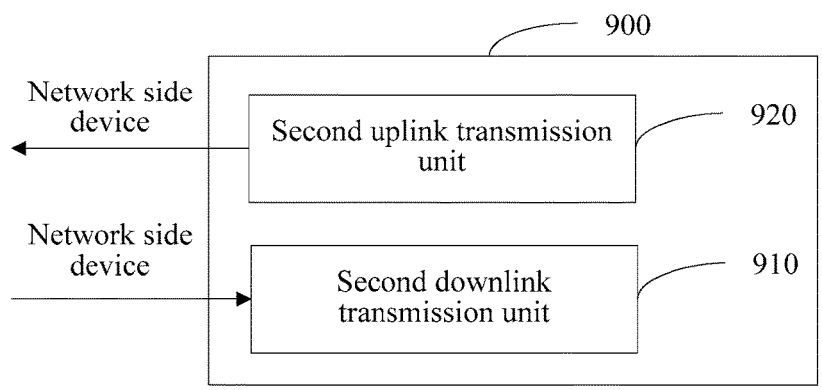
FIG. 9 is a schematic diagram of a second embodiment of a multi-carrier aggregation apparatus according to the present disclosure.

Refer to FIG. 9, FIG. 9 is a schematic diagram of a second embodiment of a multi-carrier aggregation apparatus according to the present disclosure, where the apparatus may be disposed in user equipment. The apparatus 900 includes:

a second downlink transmission unit 910, configured to perform downlink transmission with the network side device by using a downlink transmission resource within a downlink phase of a scheduling phase; and a second uplink transmission unit 920, configured to perform uplink transmission with the network side device by using an uplink transmission resource within an uplink phase of the scheduling phase, where start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time.

Optionally, the second uplink transmission unit 920 may include:

a first receiving subunit, configured to receive information, sent by the network side device, about at least one uplink resource block that is allocated to the user equipment and that is on the at least one component carrier; and an uplink transmission subunit, configured to perform uplink transmission with the network side device on the corresponding component carrier by using the uplink resource block that is allocated to the user equipment.

Optionally, the second downlink transmission unit 910 may include:

a second receiving subunit, configured to receive at least one downlink resource block that is sent by the network side device and allocated to the user equipment and that is on the at least one component carrier; and a second downlink transmission subunit, configured to perform downlink transmission with the network side device on the corresponding component carrier by using the downlink resource block that is allocated to the user equipment.

Optionally, the apparatus may further include:

a second contention unit, configured to contend for at least one component carrier, to obtain a transmission resource when at least one component carrier is successfully obtained through contention, where the second uplink transmission unit 920 may be further configured to send, to the network side device, information about the transmission resource that is obtained by the second contention unit and that is obtained when the at least one component carrier is successfully obtained through contention, so that the network side device determines the start and end times of the scheduling phase according to the information about the transmission resource that is obtained when the at least one component carrier is successfully obtained through contention.

In this embodiment, user equipment performs downlink transmission with the network side device in a downlink phase of a scheduling phase, and performs uplink transmission with the network side device in an uplink phase of the scheduling phase, to cooperate with the network side device to implement uplink and downlink transmission with the network side device, thereby improving a utilization rate of a component carrier.

Figure 10:
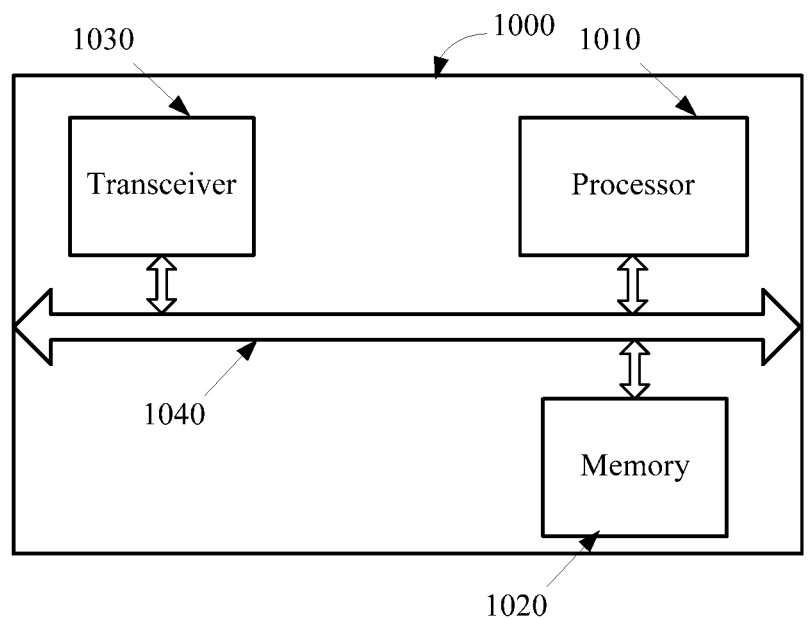
FIG. 10 is a schematic structural diagram of a network side device according to an embodiment of the present disclosure.

Refer to FIG. 10, FIG. 10 is a structural schematic diagram of a network side device according to an embodiment of the present disclosure. The network side device 1000 includes: a processor 1010, a memory 1020, a transceiver 1030, and a bus 1040.

The processor 1010, the memory 1020, and the transceiver 1030 are connected to each other by using the bus 1040, and the bus 1040 may be an ISA bus, a PCI bus, an EISA bus, or the like. The bus may be classified into an address bus, a data bus, a control bus, and the like. For ease of illustration, in FIG. 10, only one thick line is used to represent the bus, which however does not indicate that there is only one bus or only one type of bus.

The memory 1020 is configured to store a program. Specifically, the program may include program code, and the program code includes a computer operation instruction. The memory 1020 may include a high-speed RAM memory, and may further include a non-volatile memory, for example, at least one magnetic disk storage.

The processor 1010 executes the program code, and is configured to determine, according to information about a transmission resource that is obtained when at least one component carrier is successfully obtained through contention, start and end times of a scheduling phase corresponding to the at least one component carrier, where the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and the transceiver 1030 is configured to connect to another device, and communicate with the another device. Specifically, the transceiver 1030 is configured to perform downlink transmission with user equipment in the downlink phase of the scheduling phase that is determined by the processor 1010, and perform uplink transmission with the user equipment in the uplink phase of the scheduling phase that is determined by the processor 1010.

Optionally, the processor 1010 may be specifically configured to:

determine, according to the information about the transmission resource that is obtained when the at least one component carrier is successfully obtained through contention, the start time of the scheduling phase;

determine duration of the scheduling phase; and determine the start and end times of the scheduling phase according to the start time and the duration of the scheduling phase.

Optionally, the processor 1010 may be specifically configured to:

determine the start time of the scheduling phase according to a time at which a first component carrier is successfully obtained through contention and according to a first preset time; or determine the start time of the scheduling phase according to a time at which information about a transmission resource reported by first user equipment is received and according to a second preset time.

Optionally, the processor 1010 may be specifically configured to use a third preset time as the duration of the scheduling phase; or determine the duration of the scheduling phase according to a service volume and/or quality of service QoS of a service that is transmitted within the scheduling phase.

Optionally, the processor 1010 may be specifically configured to calculate the duration of the scheduling phase by using a formula T/(Data packet latency*Data error rate), where T is maximum duration of an unauthorized frequency band, and * indicates multiplication.

Optionally, an uplink transmission resource within the uplink phase of the scheduling phase corresponding to the at least one component carrier includes at least one uplink resource block, and the transceiver 1030 may be specifically configured to acquire information about at least one uplink resource block that is allocated to the user equipment by the processor 1010 and that is on the at least one component carrier, and send, to the user equipment, the information about the at least one uplink resource block that is allocated to the user equipment and that is on the at least one component carrier, so that the user equipment performs uplink transmission with the network side device on the corresponding component carrier by using the uplink resource block that is allocated to the user equipment and the processor 1010 may be further configured to allocate, to the user equipment, the at least one uplink resource block that is of the uplink transmission resource within the uplink phase of the scheduling phase and that is on the at least one component carrier.

Optionally, a downlink transmission resource within the downlink phase of the scheduling phase corresponding to the at least one component carrier includes at least one downlink resource block, and the transceiver 1030 may be specifically configured to acquire information about at least one downlink resource block that is allocated to the user equipment by the processor 1010 and that is on the at least one component carrier, send, to the user equipment, the information about the at least one downlink resource block that is allocated to the user equipment and that is on the at least one component carrier, and perform downlink transmission with the user equipment on the component carrier by using the downlink resource block that is allocated to the user equipment; and the processor 1010 may be further configured to allocate, to the user equipment, the at least one downlink resource block that is of the downlink transmission resource within the downlink phase of the scheduling phase and that is on the at least one component carrier.

In this embodiment, component carriers do not have a priority relationship in contention-based access, so that the component carriers have equal opportunities of being accessed, and load of the component carriers is balanced, thereby improving a utilization rate of a carrier with a low priority in the prior art. In addition, a network side device allocates different component carriers and different uplink resource blocks to user equipments for uplink transmission, and allocates different component carriers and different downlink resource blocks to the user equipments for downlink transmission; and overall configuration based on one bandwidth is no longer performed, so that allocation of a component carrier and a transmission resource on the component carrier becomes more flexible, thereby improving a utilization rate of a component carrier from another perspective, and reducing bandwidth waste.

Figure 11:
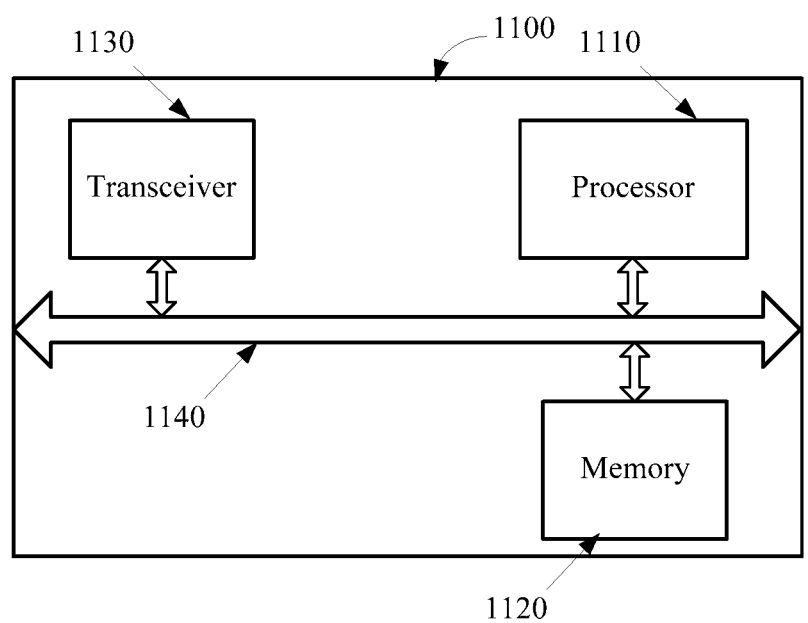
FIG. 11 is a schematic structural diagram of user equipment according to an embodiment of the present disclosure.

Refer to FIG. 11, FIG. 11 is a structural schematic diagram of user equipment according to an embodiment of the present disclosure. The user equipment 1100 includes: a processor 1110, a memory 1120, a transceiver 1130, and a bus 1140.

The processor 1110, the memory 1120, and the transceiver 1130 are connected to each other by using the bus 1140, and the bus 1140 may be an ISA bus, a PCI bus, an EISA bus, or the like. The bus may be classified into an address bus, a data bus, a control bus, and the like. For ease of illustration, in FIG. 11, only one thick line is used to represent the bus, which however does not indicate that there is only one bus or only one type of bus.

The memory 1120 is configured to store a program. Specifically, the program may include program code, and the program code includes a computer operation instruction. The memory 1120 may include a high-speed RAM memory, and may further include a non-volatile memory, for example, at least one magnetic disk storage.

The processor 1110 executes the program code.

The transceiver 1130 is configured to connect to another device, and communicate with the another device. Specifically, the transceiver 1130 is configured to perform downlink transmission with a network side device in a downlink phase of a scheduling phase, and perform uplink transmission with the network side device in an uplink phase of the scheduling phase, where start and end times of the scheduling phase are determined by the network side device according to information about a transmission resource that is obtained when at least one component carrier is successfully obtained through contention, the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time.

Optionally, the transceiver 1130 may be specifically configured to receive information, sent by the network side device, about at least one uplink resource block that is allocated to the user equipment and that is on the at least one component carrier; and perform uplink transmission with the network side device on the corresponding component carrier by using the uplink resource block that is allocated to the user equipment.

Optionally, the transceiver 1130 may be specifically configured to receive at least one downlink resource block that is sent by the network side device and allocated to the user equipment and that is on the at least one component carrier; and perform downlink transmission with the network side device on the corresponding component carrier by using the downlink resource block that is allocated to the user equipment.

Optionally, the transceiver 1130 may be further configured to contend for at least one component carrier, to obtain a transmission resource when at least one component carrier is successfully obtained through contention, and send, to the network side device, information about the transmission resource that is obtained when the at least one component carrier is successfully obtained through contention, so that the network side device determines the start and end times of the scheduling phase according to the information about the transmission resource that is obtained when the at least one component carrier is successfully obtained through contention.

In this embodiment, user equipment performs downlink transmission with a network side device in a downlink phase of a scheduling phase, and performs uplink transmission with the network side device in an uplink phase of the scheduling phase, to cooperate with the network side device to implement uplink and downlink transmission with the network side device, thereby improving a utilization rate of a component carrier.

A person skilled in the art may clearly understand that, the technologies in the embodiments of the present disclosure may be implemented by software in addition to a necessary general hardware platform. Based on such an understanding, the technical solutions in the embodiments of the present disclosure essentially or the part contributing to the prior art may be implemented in a form of a software product. The computer software product may be stored in a storage medium, such as a ROM (read-only memory)/RAM (random access memory), a magnetic disk, or an optical disc, and includes several instructions for instructing a computer device (which may be a personal computer, a server, or a network device) to perform the methods described in the embodiments or some parts of the embodiments of the present disclosure.

A person skilled in the art may understand that the modules, units, submodules, and subunits in the apparatuses in the embodiments are only for the purpose of better describing logical entities or physical entities having the functions, and are not limited to the specified names in the embodiments; and the modules/units in the apparatuses in the embodiments may be distributed in the apparatuses in the embodiments according to the description in the embodiments, or may be correspondingly changed and located in one or more apparatuses that are different from those in the embodiments. The modules, units, submodules, and subunits in the foregoing embodiments may be flexibly detached and combined during implementation.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

The foregoing descriptions are implementation manners of the present disclosure, but are not intended to limit the protection scope of the present disclosure. Any modification, equivalent replacement, and improvement made without departing from principle of the present disclosure shall fall within the protection scope of the present disclosure.

What is claimed is:

1. A multi-carrier aggregation method, comprising:
   determining, by a network side device according to information about a transmission resource that is obtained when at least one component carrier is successfully obtained through contention, start and end times of a scheduling phase corresponding to the at least one component carrier, wherein the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time, wherein the determining the start and end times of the scheduling phase comprises:
      determining, by the network side device according to the information about the transmission resource, the start time of the scheduling phase, wherein determining the start time of the scheduling phase comprises: determining, by the network side device, the start time of the scheduling phase according to a time at which a first component carrier is successfully obtained through contention and according to a first preset time; or, determining, by the network side device, the start time of the scheduling phase according to a time at which information about a transmission resource reported by the user equipment is received and according to a second preset time;
      determining, by the network side device, a duration of the scheduling phase; and
      determining, by the network side device, the start and end times of the scheduling phase according to the start time of the scheduling phase and the duration of the scheduling phase; and
   performing, by the network side device, downlink transmission with a user equipment in the downlink phase of the scheduling phase; and
   performing, by the network side device, uplink transmission with the user equipment in the uplink phase of the scheduling phase.

2. The method according to claim 1, wherein determining the duration of the scheduling phase comprises:
   using, by the network side device, a third preset time as the duration of the scheduling phase; or
   determining, by the network side device, the duration of the scheduling phase according to a service volume of a service that is transmitted within the scheduling phase; or
   determining, by the network side device, the duration of the scheduling phase according to quality of service (QoS) of a service that is transmitted within the scheduling phase; or
   determining, by the network side device, the duration of the scheduling phase according to a service volume and QoS of a service that is transmitted within the scheduling phase.

3. The method according to claim 2, wherein determining the duration of the scheduling phase comprises:
   calculating, by the network side device, the duration of the scheduling phase by using a formula $$T/(\text{Data packet latency} * \text{Data error rate}),$$

wherein T is maximum duration of an unauthorized frequency band, and * indicates multiplication.

4. The method according to claim 1, wherein the uplink transmission resource within the uplink phase of the scheduling phase corresponding to the at least one component carrier comprises at least one uplink resource block; and the performing the uplink transmission with the user equipment in the uplink phase of the scheduling phase comprises:
   allocating, by the network side device to the user equipment, the at least one uplink resource block that is of the uplink transmission resource within the uplink phase of the scheduling phase and that is on the at least one component carrier; and
   sending, by the network side device to the user equipment, information about the at least one uplink resource block that is allocated to the user equipment and that is on the at least one component carrier, so that the user equipment performs uplink transmission with the network side device on the corresponding component carrier by using the uplink resource block that is allocated to the user equipment.

5. The method according to claim 4, wherein the allocating, by the network side device to the user equipment, the at least one uplink resource block that is of the uplink transmission resource within the uplink phase of the scheduling phase and that is on the at least one component carrier comprises:
  determining, by the network side device, a sequence in which transmission resources are allocated to user equipments; and
  sequentially allocating, by the network side device to each user equipment in the determined sequence, the at least one uplink resource block that is of the uplink transmission resource within the uplink phase of the scheduling phase and that is on the at least one component carrier.

6. The method according to claim 5, wherein the determining, by the network side device, the sequence in which resources are allocated to user equipments comprises:
  determining the sequence in which resources are allocated to users based on one or more of:
    whether the user equipments report information about a transmission resource,
    priorities of the user equipments,
    volumes of services to be transmitted by the user equipments, and
    a sequence of serial numbers of the user equipments.

7. The method according to claim 1, wherein a downlink transmission resource within the downlink phase of the scheduling phase corresponding to the at least one component carrier comprises at least one downlink resource block, and the performing, by the network side device, the downlink transmission with the user equipment in the downlink phase of the scheduling phase comprises:
  allocating, by the network side device to the user equipment, the at least one downlink resource block that is of the downlink transmission resource within the downlink phase of the scheduling phase and that is on the at least one component carrier;
  sending, by the network side device to the user equipment, information about the at least one downlink resource block that is allocated to the user equipment and that is on the at least one component carrier; and
  performing, by the network side device, downlink transmission with the user equipment on the component carrier by using the downlink resource block that is allocated to the user equipment.

8. The method according to claim 7, wherein the allocating, by the network side device to the user equipment, the at least one downlink resource block that is of the downlink transmission resource within the downlink phase of the scheduling phase and that is on the at least one component carrier comprises:
  determining, by the network side device, a sequence in which transmission resources are allocated to user equipments; and
  sequentially allocating, by the network side device to each user equipment in the determined sequence, the at least one downlink resource block that is of the downlink transmission resource within the downlink phase of the scheduling phase and that is on the at least one component carrier.

9. The method according to claim 1, further comprising:
  determining, by the network side device, the uplink-downlink switch point; and
  periodically broadcasting the uplink-downlink switch point within the uplink time, the downlink time, or the uplink time and the downlink time of the component carrier.

10. The method according to claim 1, wherein before the determining, by a network side device, start and end times of a scheduling phase, the method further comprises:
  contending, by the network side device, for at least one component carrier, to obtain a transmission resource when a component carrier is successfully obtained through contention.

11. The method according to claim 10, further comprising:
  determining, by the network side device, by sensing a network allocation vector (NAV) or detecting received signal energy, whether a component carrier is successfully obtained through contention, wherein the NAV is sent when the network side device or the user equipment successfully obtains a component carrier through contention.

12. The method according to claim 1, wherein before the determining, by the network side device, the start and end times of a scheduling phase, the method further comprises:
  receiving, by the network side device, information that is sent by the user equipment and that is about a transmission resource that is obtained when at least one component carrier is successfully obtained through contention.

13. The method according to claim 1, wherein before the determining, by the network side device, the start and end times of the scheduling phase, the method further comprises:
  determining, by the network side device according to quality of service (QoS) of each service, whether a transmission mode of a component carrier is a scheduling-based transmission mode or a contention-based transmission mode; and
  performing, by the network side device when determining that the scheduling-based transmission mode is used, processing of the determining start and end times of a scheduling phase.

14. A multi-carrier aggregation method, comprising:
  sending, by a user equipment to a network side device, information about a transmission resource that is obtained when at least one component carrier is successfully obtained through contention, so that the network side device determines start and end times of a scheduling phase according to the information about the transmission resource that is obtained when the at least one component carrier is successfully obtained through contention;
  performing, by the user equipment, downlink transmission with the network side device in a downlink phase of the scheduling phase; and
  performing uplink transmission with the network side device in an uplink phase of the scheduling phase,
  wherein the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time;
  wherein the performing, by the user equipment, the downlink transmission with the network side device in the downlink phase of the scheduling phase comprises:
    receiving, by the user equipment, at least one downlink resource block that is sent by the network side device and allocated to the user equipment and that is on the at least one component carrier, and performing, by the user equipment, downlink transmission with the network side device on the corresponding component carrier by using the downlink resource block that is allocated to the user equipment;

wherein the performing, by the user equipment, the uplink transmission with the network side device in the uplink phase of the scheduling phase comprises:

receiving, by the user equipment, information, sent by the network side device, about at least one uplink resource block that is allocated to the user equipment and that is on the at least one component carrier, and performing, by the user equipment, uplink transmission with the network side device on the corresponding component carrier by using the uplink resource block that is allocated to the user equipment.

15. The method according to claim 14, wherein before the user equipment performs uplink transmission or downlink transmission with the network side device, the method further comprises:

contending, by the user equipment, for at least one component carrier, to obtain a transmission resource when at least one component carrier is successfully obtained through contention.

16. A network side device, comprising:
a processor; and
a transceiver,
wherein the processor is configured to:
determine, according to information about a transmission resource that is obtained when at least one component carrier is successfully obtained through contention, a start time of a scheduling phase corresponding to the at least one component carrier, wherein determining the start time of the scheduling phase comprises: determining the start time of the scheduling phase according to a time at which the network side device successfully obtains a first component carrier through contention and according to a first preset time; or, determining the start time of the scheduling phase according to a time at which the network side device receives information about a transmission resource reported by first user equipment and according to a second preset time,
determine a duration of the scheduling phase, and
determine an end time of the scheduling phase according to the start time of the scheduling phase and the duration of the scheduling phase;
wherein the scheduling phase is divided by an uplink-downlink switch point into an uplink phase of the scheduling phase and a downlink phase of the scheduling phase, the uplink-downlink switch point is used to divide a time to obtain an uplink time of the component carrier and a downlink time of the component carrier, and uplink-downlink switch points of two or more component carriers are aligned in time; and
wherein the transceiver is configured to perform downlink transmission with user equipment in the downlink phase of the scheduling phase that is determined by the processor, and perform uplink transmission with the user equipment in the uplink phase of the scheduling phase that is determined by the processor.

17. The network side device according to claim 16, wherein the processor is further configured to:
use a third preset time as the duration of the scheduling phase; or determine the duration of the scheduling phase according to a service volume of a service that is transmitted within the scheduling phase; or determine the duration of the scheduling phase according to quality of service (QoS) of a service that is transmitted within the scheduling phase; or determine the duration of the scheduling phase according to a service volume and QoS of a service that is transmitted within the scheduling phase.

18. The network side device according to claim 17, wherein the processor is further configured to:
calculate the duration of the scheduling phase by using a formula $$T/(\text{Data packet latency} * \text{Data error rate}),$$

wherein T is maximum duration of an unauthorized frequency band, and * indicates multiplication.

19. The network side device according to claim 16, wherein:
an uplink transmission resource within the uplink phase of the scheduling phase corresponding to the at least one component carrier comprises at least one uplink resource block;
the transceiver is further configured to acquire information about at least one uplink resource block that is allocated to the user equipment by the processor and that is on the at least one component carrier, and send, to the user equipment, the information about the at least one uplink resource block that is allocated to the user equipment and that is on the at least one component carrier, so that the user equipment performs uplink transmission with the network side device on the corresponding component carrier by using the uplink resource block that is allocated to the user equipment; and
the processor is further configured to allocate, to the user equipment, the at least one uplink resource block that is of the uplink transmission resource within the uplink phase of the scheduling phase and that is on the at least one component carrier.

20. The network side device according to claim 16, wherein:
a downlink transmission resource within the downlink phase of the scheduling phase corresponding to the at least one component carrier comprises at least one downlink resource block;
the transceiver is further configured to acquire information about at least one downlink resource block that is allocated to the user equipment by the processor and that is on the at least one component carrier, send, to the user equipment, the information about the at least one downlink resource block that is allocated to the user equipment and that is on the at least one component carrier, and perform downlink transmission with the user equipment on the component carrier by using the downlink resource block that is allocated to the user equipment; and
the processor is further configured to allocate, to the user equipment, the at least one downlink resource block that is of the downlink transmission resource within the downlink phase of the scheduling phase and that is on the at least one component carrier.

21. A user equipment, comprising:
a transceiver configured to:
send, to a network side device, information about a transmission resource that is obtained when at least one component carrier is successfully obtained through contention, so that the network side device determines start and end times of a scheduling phase according to the information about the transmission resource that is obtained when the at least one component carrier is successfully obtained through contention, perform downlink transmission with the network side device in a downlink phase of the scheduling phase, and perform uplink transmission with the network side device in an uplink phase of the scheduling phase, wherein the scheduling phase is divided by an uplink-downlink switch point into the uplink phase of the scheduling phase and the downlink phase of the scheduling phase, the uplink-downlink switch point is used to divide a time to obtain an uplink time of the component carrier and a downlink time of the component carrier, and uplink-downlink switch points of two or more component carriers are aligned in time;

wherein performing the uplink transmission comprises:
receiving information, sent by the network side device, about at least one uplink resource block that is allocated to the user equipment and that is on the at least one component carrier, and performing the uplink transmission with the network side device on the corresponding component carrier by using the uplink resource block that is allocated to the user equipment;

wherein performing the downlink transmission comprises:
receiving at least one downlink resource block that is sent by the network side device and allocated to the user equipment and that is on the at least one component carrier, and performing downlink transmission with the network side device on the corresponding component carrier by using the downlink resource block that is allocated to the user equipment.

22. The user equipment according to claim 21, wherein the transceiver is further configured to:
contend for at least one component carrier to obtain a transmission resource when at least one component carrier is successfully obtained through contention.

\* \* \* \* \*